United States Patent [19]

Saganovsky

[11] Patent Number: 4,839,570
[45] Date of Patent: Jun. 13, 1989

[54] CURRENT LIMITING CONTROL CIRCUIT FOR D.C. MOTORS

[75] Inventor: Abraham Saganovsky, Brooklyn, N.Y.

[73] Assignee: K. B. Electronics Inc., Brooklyn, N.Y.

[21] Appl. No.: 186,597

[22] Filed: Apr. 27, 1988

[51] Int. Cl.[4] ............................................. G05B 5/00
[52] U.S. Cl. ........................................... 388/815; 361/87; 388/902; 388/903; 388/910; 388/915; 388/918; 388/921
[58] Field of Search ............................... 318/306–318, 318/139, 138, 254, 339–342, 345 R, 345 A, 345 C, 345 G, 345 E, 449–450, 452–455, 504; 361/23, 30, 31, 88, 90–91, 93, 100

[56] References Cited

U.S. PATENT DOCUMENTS

| | | | |
|---|---|---|---|
| 3,551,774 | 12/1970 | Rusch | 318/139 |
| 3,999,108 | 12/1976 | Tanikoshi | 318/138 |
| 4,297,623 | 10/1981 | Dupont | 318/278 |
| 4,371,818 | 2/1983 | Lewis | 318/317 |
| 4,468,597 | 8/1984 | Baumard et al. | 318/317 |
| 4,511,830 | 4/1985 | Yamada et al. | 318/318 |
| 4,514,665 | 4/1985 | Melocik et al. | 318/139 |

Primary Examiner—William M. Shoop, Jr.
Assistant Examiner—David S. Martin
Attorney, Agent, or Firm—Lieberman Rudolph & Nowak

[57] ABSTRACT

A current limiting control circuit for a d.c. motor, wherein compensation is provided for the inherent voltage drop across the armature of the d.c. motor with a first dedicated amplifier, while a second dedicated amplifier provides current limit control. In providing a separate and dedicated amplifier for the current limiting function, the limitations inherent in the current/resistance compensation circuit, such as lag in response time, are avoided.

5 Claims, 4 Drawing Sheets

4,839,570

CURRENT LIMITING CONTROL CIRCUIT FOR D.C. MOTORS

FIELD OF THE INVENTION

The present invention is directed to controlling the application of direct current to a reversible d.c. electric motor, and more particularly to a circuit arrangement for producing current limit signals for control purposes.

BACKGROUND OF THE INVENTION

Conventional control circuits for d.c. motors are utilized in many industrial machines such as paper processing apparatus, loaders, trucks and the like. These known circuits usually employ silicon controlled rectifiers integrated in the motor electric supply circuit, and some device to produce a train of pulses arranged to effect periodic conduction of the rectifiers. In this manner, the motor is energized by pulses of direct current, and control of the duration of the pulses is utilized for motor control purposes such as speed of the motor drive, and for compensation during various load conditions.

It has been found that more precise control of motor speed is available if compensation is considered, and provision made for the effect of the internal resistance in motor armatures. Such internal resistances produce corresponding voltage drops across the armature in accordance with the current to the armature. Since motor speed is proportional to the voltage applied to the motor, any voltage drop across the armature will correspondingly lower the voltage available for energization of the motor.

In order to offset the controlling effects resulting from this inherent characteristic, use is made of compensating circuits which are adapted to adjust, or to cancel out, the effect of armature resistance.

One method of compensation in this regard is to boost the voltage produced in the control circuit, and made available for the motor supply, to an amount equal to the voltage drop at any controlled motor speed.

In U.S. Pat. No. 3,551,774, a circuit is disclosed for controlling current to a d.c. motor utilizing temperature variations in the rectifier circuit, which serves as the electrical power supply for the d.c. motor. While this arrangement serves as a good safety technique for the motor and the rectifier circuit, accurate control of motor speed, and responsiveness to the need for quick control, are significantly reduced.

In U.S. Pat. No. 4,514,665, a more sophisticated current limit control is described, including a microprocessor for controlling appropriate pulse train waveforms for the controlling of speed to a vehicle d.c. motor. The circuitry and components therefor to accomplish this control function are rather involved and costly. Because of the indirect application of a control signal, it is doubtful that the response time for motor reaction is sufficiently fast for operator use. In any event, the required components are not necessarily inexpensive when considering invested capital.

In conventional control circuits, current is sensed across the armature of the d.c. motor by utilizing a resistor specifically assigned for this sensing purpose. The voltage developed across this resistor is amplified, compared to a reference voltage and then applied, perhaps through modifying circuits such as for current compensation, to the power supply of the motor being controlled. A trigger circuit may be utilized for the direct application of an error signal produced as a result of the comparison of the sensed voltage, thereby effecting appropriate corrective control of the motor.

Conventional controlling circuits, however, in amplifying current limiting signals, utilize amplifier circuits which perform other amplifying functions, such as in producing the compensating current signal for the cancelling out of the effect of the armature resistance as discussed above. In control circuits on the market today, a single amplifier is utilized with a set of voltage dividers. One divider is used for the current limiting function, while the other divider is used for current/resistance compensation. The disadvantage in this arrangement is that response to the production and application of corrective current limiting signals is slow, since the time response for compensation is itself slow. While the time constant involving the current limiting function is much faster, nevertheless, the time constant for the amplifier must be made as slow as the slowest required signal.

SUMMARY OF THE INVENTION

In order to overcome the disadvantages of the circuitry discussed above, the present invention is directed to a controlling circuit wherein a sensing signal is produced, indicative of the current through a sensing resistor arranged to sense the voltage drop across the armature of a d.c. motor. The sensing signal is conducted to an amplifier whereat it is amplified and compared to a reference voltage to produce an error signal in accordance with current limiting need for the motor. This amplifier is dedicated solely to the current limiting function, and the amplified corrective signal is fed directly into a trigger circuit, which controls the d.c. power supply to the motor. Preferably, the d.c. power supply comprises a full wave bridge circuit employing a silicon controlled rectifier in each of its input legs, rather than being battery operated, or utilizing other electronic components, thereby assuring that time responsiveness and accuracy are not jeopardized.

Therefore, it is the principal object of the present invention to control the current supply to a d.c. motor so that the response time for reaction is extremely fast and its operative capability is accurate and predictable.

It is a feature of the present invention to supply a corrective signal to a d.c. motor for current limiting purposes, in the shortest period of time, by producing the signal in a circuit dedicated solely for this purpose, and by directly feeding the signal into the power supply to the motor.

These and other objects and features of the invention will become readily apparent to those skilled in the art, while taking the following description in conjunction with the accompanying drawings wherein:

BRIEF DESCRIPTION OF THE DRAWINGS

FIGS. 2A, 2B and 3B schematic diagrams of an overall motor control system incorporating the present invention.

DETAILED DESCRIPTION

Figure 1:
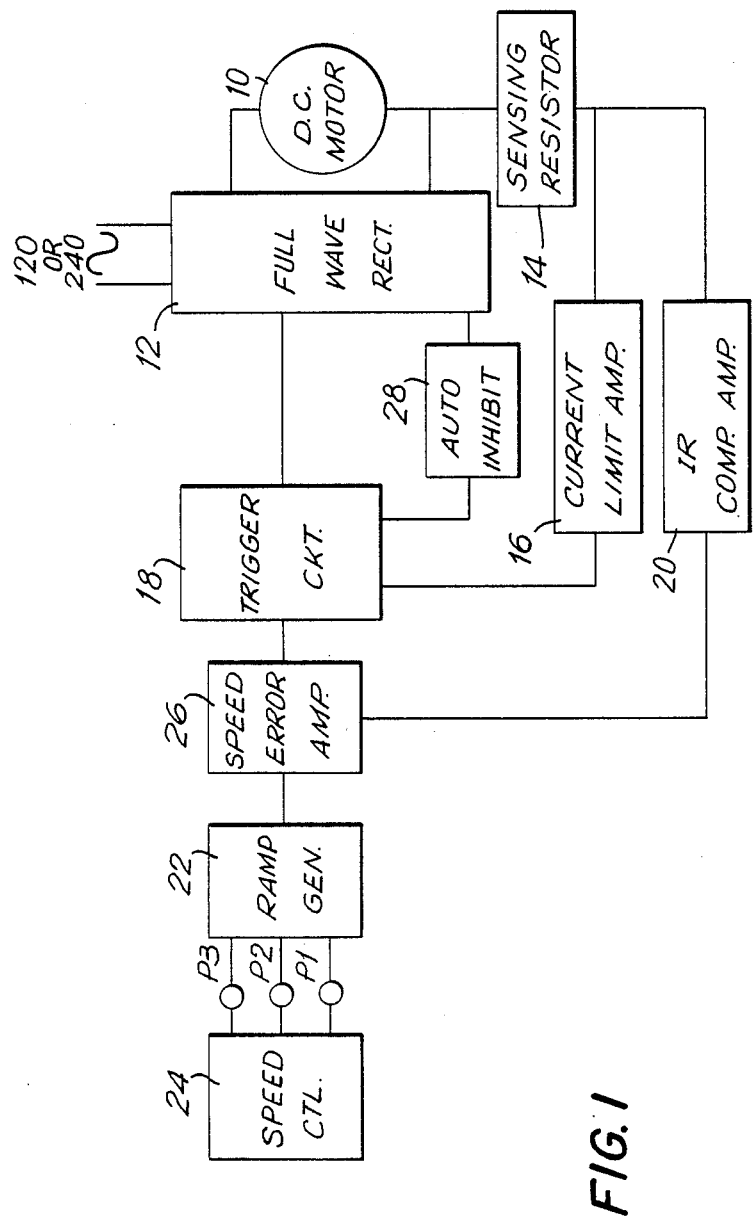
FIG. 1 is a block diagram of the preferred embodiment of the present invention.

The block diagram of FIG. 1 illustrates the general arrangement of circuitry for controlling the speed of a d.c. motor 10 and for providing current limit control thereto. A full wave rectifying circuit 12 having an a.c.

input of either 120 volts or 240 volts, serves as the power supply to the motor. A motor sensing device 14, in the form of a resistor, is arranged to sense the voltage across the armature of the motor 10. The sensed voltage is fed and integrated into an amplifier circuit 16 for current limiting purposes. Within the amplifier circuit 16, the upper limit set point for motor current is established. Upon activation of the circuit 16 (when the motor current is above the set point), a resultant signal is conducted to a trigger circuit 18 for the rectifying circuit 12, thereby energizing the motor 10 in accordance with the desired current limiting conditions.

The voltage drop from the sensing resistor 14 is also conducted to a current/resistance (IR) compensating circuit 20, which serves to compensate for the inherent internal resistance of the motor armature in accordance with varying loads on the motor. A speed error amplifier 26 receives an error signal across the output of the controlling circuitry for the motor 10 in order to maintain speed according to desired speed settings.

Another modifying circuit integrated into the system illustrated in FIG. 1, is a linear ramp generator circuit 22 which serves to control motor acceleration and deceleration by the application of an operator induced control signal for the motor 10 by way of a main speed device 24 in the form of a potentiometer. A speed error amplifier 26 is interposed between the ramp generator 22 and the trigger circuit 18 adding voltage to the operator induced voltage to compensate for internal armature resistance. Finally, the system of FIG. 1 includes an automatic inhibit circuit 28, which automatically inhibits the current control of the motor in the event sudden drops in the input power to the power supply for the motor 10, and quick return of full input power occur while charging capacitors have not been fully discharged.

Figure 2A:
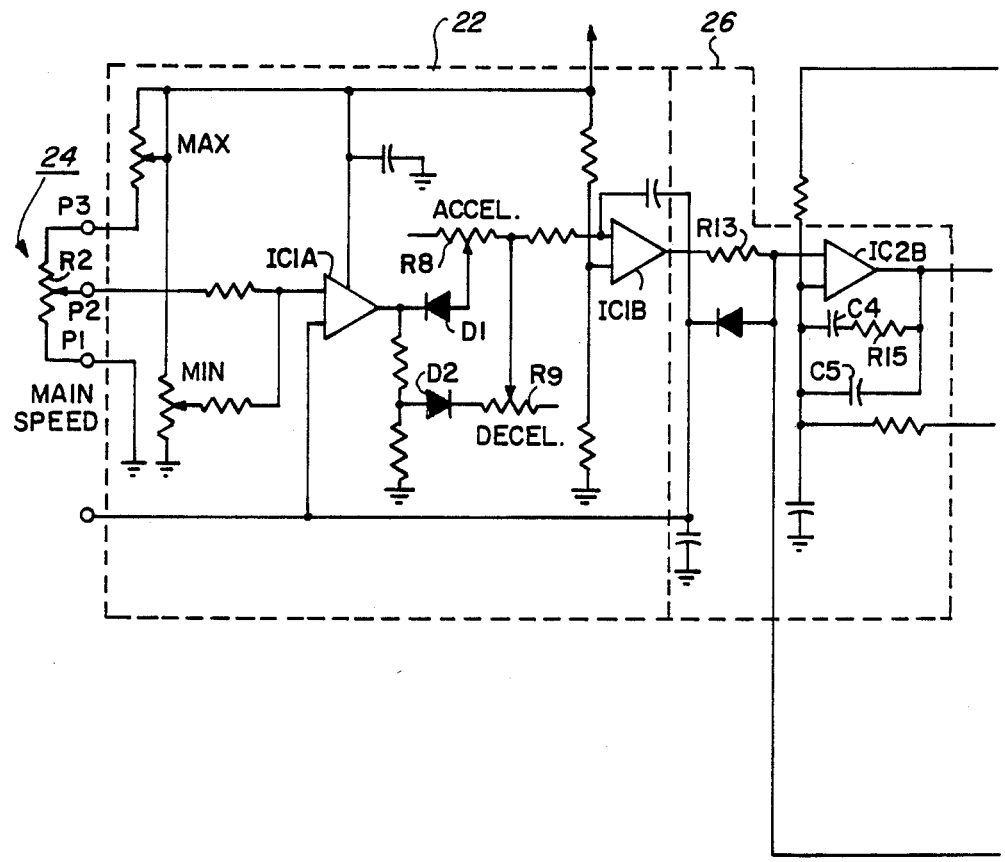
Figure 2B:
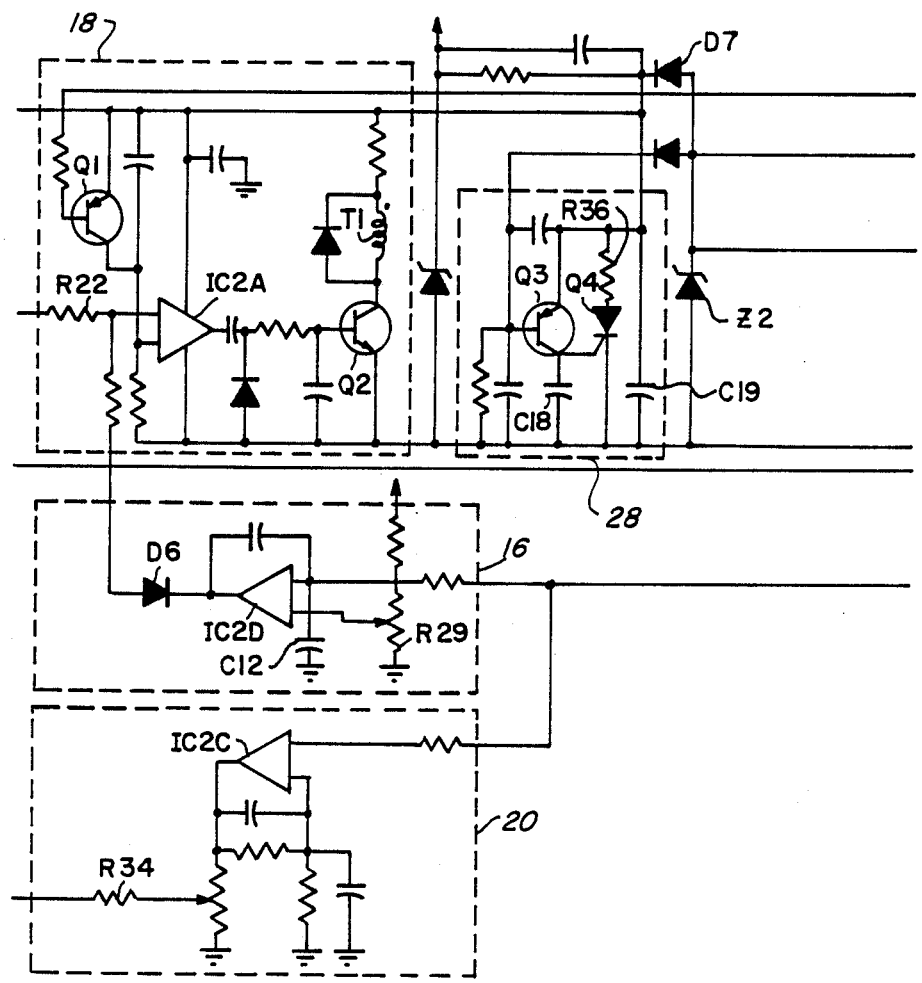
Figure 2C:
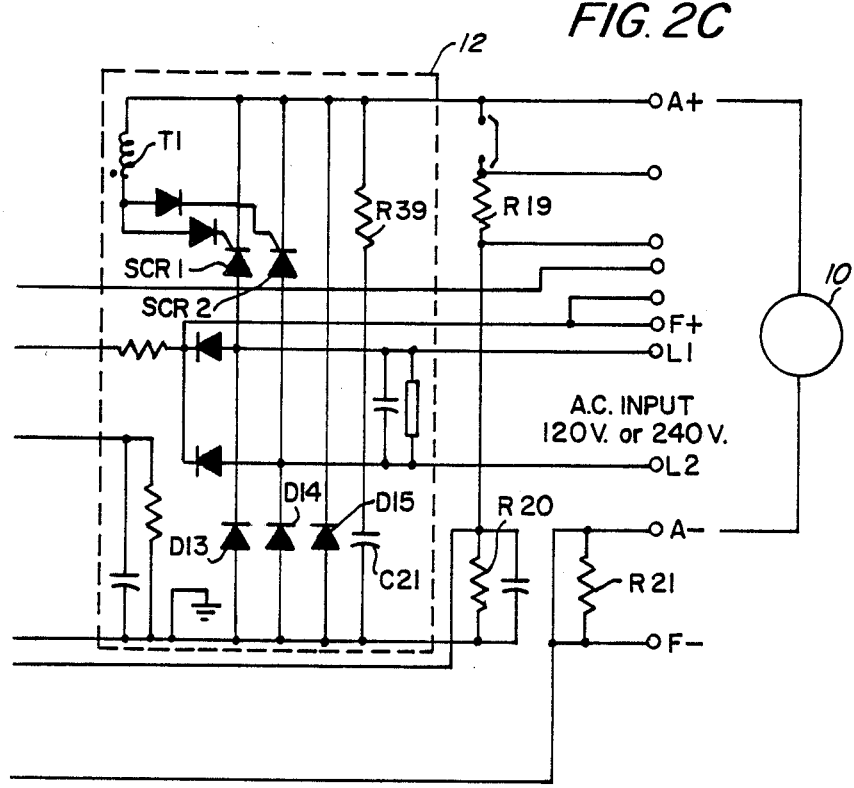

For a more detailed description of the circuitry embodying the present invention, the circuit diagrams of FIGS. 2A-2C illustrate specific embodiments thereof.

As shown in FIG. 2C, the armature for the motor 10 is adapted to be energized directly by the full wave bridge circuit 12, which includes a pair of silicon controlled rectifiers SCR 1 and SCR 2, one in each of the input legs of the bridge circuit, diodes D13 and D14 in the other legs of the bridge, the diode D15, resistor R39 and capacitor C21. A.c. input of either 120 v or 240 v is brought into the bridge circuit by way of terminals L1, L2. The output of the bridge circuit is connected to the armature of the motor 10 by way of terminals A+ and A−, and the field coil of the motor is connected to the terminals F+ and F−.

A current sensing resistor R21 is connected to the armature of the motor at the terminal A−. This resistor serves to sense the current through the armature and develops a voltage proportional to the current. As an example, if the motor 10 develops 1 hp by drawing 10 amps d.c. at full load, approximately 100 millivolts is produced in the resistor R21. This voltage is fed into the two operative amplifiers: the current limiting circuit 16 and the current/resistance compensating circuit 20.

The signal developed in the resistor R21, which is indicative of the voltage drop across the armature of the motor under various loading conditions, is utilized to provide compensating voltage for that lost by virtue of the internal resistance of the armature. This voltage is added to the voltage, which is normally impressed upon the motor for speed control during normal operation of the motor so that the motor is always induced with the proper voltage level indicative of operator demand. For example, it will be assumed the motor 10 is a one horsepower motor, has a 10 amp rating, and with energization by 100 volts, it will provide 2000 rpm. If the voltage is reduced 50 volts, it will produce 1000 rpm. However, when the motor begins to experience a load from 0 amps current to 10 amps, for example, a voltage drop appears across the armature. Assuming the internal resistance of the armature is one ohm, at 10 amps, there will be a 10 volt drop across the armature. A nominal 50 volt input to the motor will, in effect, result only in the motor receiving 40 volts. Since in a d.c. motor speed is proportional to voltage, the motor will develop only 800 rpm.

The compensating circuit 20 will produce the needed 10 volts, which can be pre-set when the motor load is to draw 10 amps, and to add this voltage to the speed amplifier circuit 26, as will be discussed below. The circuit 20 is linear, so that at 5 amps it will produce 5 volts and at 2½ amps, it will produce 2½ volts. In operation, then, in the example above, if 50 volts is normally induced into the motor, the control system will actually impress a total of 60 volts upon the motor.

The voltage drop signal produced by the resistor R21 will also be conducted to the current limiting circuit 16, where it is amplified by amplifier IC2D. The amplified signal is directed to a high gain comparator consisting of the device directed to a high gain comparator consisting of the device IC2A in the trigger circuit 18, as one of its inputs. In the circuit 16, a potentiometer R29 connected as an input to IC2D, is pre-set to adjust the threshold at which IC2D conducts. In this circuit, the capacitor C12 acts as a noise capacitor. When the voltage increases across the resistor R21, which is an indication the current is increasing through the motor 10, a threshold is set up in IC2D, and when the voltage in the resistor R21 reaches the level pre-set in the potentiometer R29, the amplifier IC2D starts to conduct.

The amplified signal from IC2D is conducted to the input side of a device IC2A in the trigger circuit 18. As the amplifier IC2D starts to conduct, it pulls the input to the comparator of IC2A to zero when the reference point of the amplifier IC2D is reached.

In the operation of the current limiting circuit 16, the parameters for the above-described example will be utilized. For the 10 amp motor, a threshold in R29 is set with current limits of 15 amps. The current limiting circuit will not operate until the current starts to approach approximately 14.8-14.9 amps, and upon reaching 15 amps, the threshold of comparator IC2D starts to conduct, resulting in pulling of the signal away from resistor R22, whereupon IC2A levels off at the 15 amp level.

Normally, when the current limit is not reached, the output of IC2D is almost at full supply voltage of approximately +22 volts. Since the input of IC2A at the connection to the resistor R22 never reaches this voltage, which is the control voltage for the comparator, the diode D6 is always reversed biased, the normal running condition of the system. However, when the current in the motor reaches the pre-set threshold or current limit, the voltage at the output of the amplifier IC2D lowers and becomes lower than at the input of IC2A, resulting in the conduction of the diode D6. This, in turn, causes the pulling down of the input of IC2A from the resistor R22 and, consequently, the changes in phasing of IC2A. This change in phasing, at the output of the comparator IC2A, is transmitted to the firing gate electrodes of the silicon controlled rectifiers SCR1, SCR2, to cause firing thereof later in the input cycles therefor. In this manner, the output voltage of the bridge circuit 12 decreases, and the current to the motor also decreases to an appropriate amount. In a very heavy overload situation, the control decreases up to the point where current to the motor can go to zero.

The trigger circuit 18 includes transistors Q1 and Q2, which are adapted to change the phasing of the firing of the silicon controlled rectifiers SCR1 and SCR2. The transistor Q1 is used to synchronize the trigger with zero crossing voltage of the full wave rectified voltage on the sensor diode Z2, and the diode D7 serves as the isolation diode. As previously stated, the effect of changing of the phasing of IC2A is transmitted to the rectifiers SCR1, SCR2 for controlling the power input to the motor 10. The change in phasing by the transistors Q1 and Q2 is performed by way of the transformer T1, with the transistor Q2 actually serving as the firing component for the rectifiers SCR1, SCR2 through the transformer.

Operator control for the system of FIGS. 2A–2C is illustrated in FIG. 2A, in the form of the linear ramp generator 22 and the main speed device 24, which is the potentiometer R2. The potentiometer R2 is the main speed control for the operation of the motor 10 and is arranged to set up reference voltages which are conducted into amplifiers IC1A and IC1B. The amplifiers IC1A and IC1B, and their related electronic components, operate as accelerator and decelerator devices, respectively, in the operative responses of the motor.

The circuit 22 functions to provide an operator settable pre-set delay in the conduction of electric power to the motor 10, regardless of whether the speed of the motor is up or down, or forward or in reverse. In this manner, motor speed increase or decrease is delayed in the event an operator manipulated the speed potentiometer R2 too rapidly in either direction. If the application for the control system is utilized, for example, in a paper processing machine, and if the motor responded too quickly, it may tear the web of paper being processed. On the other hand, if the motor in use suddenly stopped, mechanical inertia, especially with a high friction load, may cause damaging effects.

In the circuit 22, the potentiometer R8, and associated diode D1, serve to vary the delayed time for an increase in motor speed, and the potentiometer R9 and diode D2 serve to vary the delayed time for a decrease in motor speed. With proper parameters, the time delays may be adjustable from 0.2 to 10.0 seconds. The output signal of the ramp generator circuit 22, applied to resistor R13, is a d.c. filtered voltage. This signal follows the motion ff the potentiometer R2 with an adjustable delay. As previously discussed, the compensating amplifier circuit 20 produces a signal indicative of the inherent internal resistance of the armature for the motor 10 for any load placed on the motor. This compensating signal is conducted by way of the resistor R34, to a junction between the resistor R13 and the voltage reference amplifier IC2B, which is in effect a speed error amplifier. This compensating signal, as fed by R34, is added to the command signal from the ramp generator circuit 22, which is fed through the resistor R13. Their combined signal is transmitted to the motor supply circuit for energizing the motor in accordance with the total voltage.

In operation, the speed error amplifier IC2B takes the error signals between R13, which is the reference speed, and the feedback voltage developed between the resistors R19 and R20. The amplifier measures the voltage across the output of the motor control and compares it with the reference voltage established out of the potentiometer setting of R2. During this action, the compensating network comprising IC2B, the capacitors C4, C5 and the resistor R15, serve to integrate and process the signal, and enhance the frequency response of the control.

The automatic inhibit circuit 28 is actually a part of the supply circuitry for the motor 10. It is utilized to protect the motor from damage in the event the a.c. input is turned on and off very abruptly before the power supply capacitors have a chance to fully discharge. When a.c. is present in the circuit 12, the capacitor C18 is charged. When the a.c. is cut off, the transistor Q3 closes and discharges the voltage in C18 through the SCR switch Q4. Assuming the resistor R36 is one ohm, and the capacitor C19 is rated at 100 microfarad, the time constant for discharge of the capacitor C19 is 100 microseconds. This arrangement, in effect, brings the capacitor voltage of C19 from approximately 22 volts down to one-half volt in a half a millisecond.

The foregoing description of the control system for d.c. motor utilizes a separate and dedicated amplifier for current limiting control of the motor. In the art, current limit control is generally made available in a current limit control circuit which also provides for current/resistance compensation. In other words, the circuits 16 and 20 are generally combined into a single amplifier circuit, which performs the function of both circuits. However, in providing a separate and dedicated amplifier circuit for the current limiting function, the limitations inherent in the current/resistance compensation circuit, such as lag in response time, is avoided. In addition, by having a dedicated amplifier circuit, the same may be integrated into the speed control circuitry at a point which is more efficient in control processing than would be the case if a single, all purpose, amplifier were used. In the present invention, the integration of a dedicated current limit amplifier results in quick-acting response, which is not available with a multi-use amplifier. The quick-acting characteristic is augmented by virtue of the fact that the signal produced in the current limit amplifier is directly fed into the trigger circuit for the power supply for the motor being controlled.

From the foregoing, it will be apparent that the present invention provides d.c. motor speed control, which is most responsive to operator demands, both as to preciseness and to timeliness. For application machines which utilize large sized d.c. motors, the present invention is particularly adapted to provide a drive which can be accurately applied in a very precise and timely manner.

While the present invention is particularly adapted with respect to the circuitry disclosed, it is not to be considered as confined to the details set forth, but is intended to cover such modification, or changes, as may come within the scope of the following claims. For example, the trigger circuit 18 may utilize unijunction transistors, programmable unijunction transistors, or combinations of other transistors.

What is claimed is:

1. In a control system for controlling the operational speed of a d.c. motor having an armature and full wave bridge circuit connected to the motor for energizing the same, wherein the bridge circuit includes a pair of silicon controlled rectifiers, sensing means for sensing the voltage drop across the armature of the motor, a trigger circuit connected to the bridge circuit for controlling the phase at which the rectifiers become operative and thereby controlling the level of voltage induced upon the motor, current limiting circuit means connected to the sensing means arranged for comparing the sensed voltage to a reference voltage and producing a signal indicative of the current through the armature above a pre-set value, and an operator speed control circuit operatively associated with the bridge circuit for producing a speed control voltage for permitting operator settable speed control of the motor, the improvement comprising:

means for connecting the output of the current limiting circuit means directly to the input of the trigger circuit for impressing the signal thereon in the event the current through the armature is above the pre-set value, a compensating circuit arranged to sense the voltage drop across the armature indicative of the inherent internal resistance of the armature and to produce a compensating voltage in accordance thereof, and means for connecting the output of said compensating circuit to the output of the speed control circuit for adding said compensating voltage to said speed control voltage.

2. In a control system for controlling the operational speed of a d.c. motor having an armature and a full wave bridge circuit connected to the motor for energizing the same, sensing means for sensing the voltage drop across the armature of the motor, a control circuit means connected to the bridge circuit for determining the level of voltage to be induced upon the motor, current limiting circuit means connected to the sensing means arranged for comparing the sensed voltage to a reference voltage and producing a signal indicative of the current through the armature above a pre-set value, the improvement comprising:

an operator speed control circuit operatively associated with the bridge circuit for effecting operator settable speed control of the motor, means for connecting the output of the current limiting circuit means directly to the input of the control circuit means for impressing the signal thereon in the event the current through the armature is above the pre-set value, a compensating circuit arranged to sense the voltage drop across the armature indicative of the inherent internal resistance of the armature, and to produce a compensating voltage in accordance thereof, and means for connecting the output of said compensating circuit to the output of said speed control circuit for introducing said compensating voltage into said speed control circuit.

3. The control system of claim 2 wherein the operator speed control circuit includes means for producing a time delay in the application of said speed control voltage when the same is rapidly increased.

4. The control system of claim 2 wherein the operator speed control circuit includes means for producing a time delay in the application of said speed control voltage when the same is rapidly decreased.

5. In a control system for controlling the operational speed of a d.c. motor having an armature and a full wave bridge circuit connected to the motor for energizing the same, sensing means for sensing the voltage drop across the armature of the motor, a control circuit means connected to the bridge circuit for determining the level of voltage to be induced upon the motor, current limiting circuit means connected to the sensing means arranged for comparing the sensed voltage to a reference voltage and producing a signal indicative of the current through the armature above a pre-set value, and an operator speed control circuit operatively associated with the bridge circuit for effecting operator settable speed control of the motor, the improvement comprising:

an amplifier circuit operatively connected between the control circuit means and the operator speed control circuit, means for connecting the output of the current limiting circuit means to the output of said amplifier circuit, a compensating circuit arranged to sense the voltage drop across the armature indicative of the inherent internal resistance of the armature and to produce a compensating voltage in accordance thereof, and means for connecting the output of said compensating circuit as an input to said amplifier circuit.

* * * * *